United States Patent

Erbacher

[15] 3,680,383
[45] Aug. 1, 1972

[54] GODETS WITH CONTACTLESS TRANSMISSION UNITS IN ELECTRICALLY OPERATED SENSING CIRCUITS

[72] Inventor: Alfons Erbacher, Grossostheim, Germany

[73] Assignee: Glanzstoff AG, Wuppertal, Germany

[22] Filed: Dec. 22, 1969

[21] Appl. No.: 886,833

[30] Foreign Application Priority Data

Dec. 31, 1968 Germany............P 18 17 612.0

[52] U.S. Cl....................73/351, 18/8 B, 73/362 AR
[51] Int. Cl........................G01k 13/00, G01k 13/08
[58] Field of Search............73/351; 18/8 B; 226/174; 335/272, 266; 318/613, 212, 265, 169

[56] References Cited

UNITED STATES PATENTS 2,119,205  5/1938  Doyle........................318/212 X
3,344,378  9/1967  Wilhelmson..................335/272
3,492,615  1/1970  Watkins....................335/272 X

FOREIGN PATENTS OR APPLICATIONS 1,223,029  8/1966  Germany........................73/351

Primary Examiner—Louis R. Prince
Assistant Examiner—Denis E. Corr
Attorney—Johnston, Root, O'Keeffe, Keil, Thompson & Shurtleff

[57] ABSTRACT

Godets for textile machines are provided with a Wien-Robinson measuring bridge revolving with the godet, the input and output of which is connected with a contactless transmission device mounted on the godet circumference. Two contactless transmission devices are mounted in fixed position, past which run the orbiting transmission devices. Magnetically functional members stop the godet in predetermined rest position with the transmission devices aligned.

11 Claims, 5 Drawing Figures

PATENTED AUG 1 1972 3,680,383

INVENTOR
ALFONS ERBACHER
ATTORNEYS

GODETS WITH CONTACTLESS TRANSMISSION UNITS IN ELECTRICALLY OPERATED SENSING CIRCUITS

INTRODUCTION

In a known device for the contactless transmission of the measurement values of physical magnitudes, for example temperatures of rotating godets, Wien-Robinson measuring bridges revolve with the godets. Their feed voltages are supplied inductively, and they transmit their measurement values inductively to the stationary receiver on the machine frame. See German published specification No. 1,223,029. The measurement value generator, a temperature-dependent resistance element, lies in a bridge branch of the Wien-Robinson measuring bridge. An induction coil is connected in each of the bridge input and the bridge output. The coils are placed on the circumference of the godet. For the feed of the bridge voltage and transmission of the measured values, a coil is mounted in fixed position on the frame. The fixed coils surround, in a known manner, a ferromagnetic ring provided with a gap. The induction coils are attached to the circumference of the rotating godet and orbit through the gap. The induction coils revolving with the godet are, like the two fixed induction coils, arranged diametrically opposite one another. As soon as rotating induction coil runs past a fixed induction coil, both coils are electromagnetically linked with one another. This periodic, successive linkage suffices for the transmission of the measurement value. Since in a Wien-Robinson measuring bridge input and output are interchangeable with one another, it is of no consequence which of the two induction coils revolving with the godet happens to run past one of the fixed coils. In each passing, the measurement value is transmitted once. For a faultless transmission of the measurement value it is sufficient to let the induction coils revolving with the godets occupy or cover only a small portion of the godet circumference. With induction coils with these small proportions, however, the probability is very high that the fixed induction coils and those revolving with the godets will not be opposite one another when the godets come to a standstill. For this reason, generally no measurement values are transmitted to the receiving device when the godets are at a standstill.

This phenomenon is a significant disadvantage in the case of heatable godets, in which the temperature measurement values serve as actual values for the temperature regulation of the godet. In order to shorten the heating time of the godets, the trend is to heat the godets at a standstill to the desired temperature. The above-mentioned contactless measurement value transmission device does not permit, when godets are at a standstill, any certainty of transmission of the measurement values to the receiving apparatus. For this reason there is present a danger that the godets at a standstill will be overheated and thereby be damaged.

An obvious solution is to arrange the revolving induction coils with each covering a half-circumference of the godets. Such large, arcuate induction coils, however, are very expensive. Moreover, even with such an arrangement, measurement value transmission at standstill may not occur if the spaces between ends of the two induction coils revolving with the godets stop opposite the fixed induction coils.

THE INVENTION HEREIN

Underlying the invention is the problem of developing a contactless measuring device for godets wherein, with a godet at a standstill, there is assured a dependable measurement value transmission from the godet to a fixed receiving device.

According to the invention, this objective is achieved by the means of a magnetically generated force brought into operation when the godet drive is switched off. The godet is drawn by the magnetic action so that the godet and its measurement transmission devices come to a standstill in predetermined position relative to the fixed receiving units for assured transmission of the measurement values.

In this position the induction coils arranged on the godets and the fixed induction coils stand opposite one another. In the heating of the godets at a standstill the actual values are sensed and transmitted to the temperature regulators, whereby any uncontrolled overheating of the godets is avoided.

In a preferred form of the invention, the drive shaft of the rotatably driven godet has two diametrically opposite magnetically responsive projections which at standstill align with two diametrically opposite, stationary poles equipped with coils. After the switching off of the godet drive, the coils of the poles are energized with direct current or alternating current. As the godet comes to rest, it is magnetically induced into a predetermined rest position in which the distances between the stationary poles carrying the coils and the projections of the shaft are shortest. The induction coils arranged in fixed position are set along a circular path concentric to the godet circumference in such a way that the orbiting coils attached to the godet and the fixed coils stand opposite one another in the rest position. The direct current or alternating current feed of the coils on the poles then can be switched off when the godet has reached the established rest position, provided there are no static imbalances of the rotatable parts.

The rotating godets are frequently driven with two- or four-pole synchronous motors which have poles of permanent magnets. In such a drive, the rest position of the godet, in which the transmission devices attached to the godet and the fixed transmission devices stand opposite one another, is achieved by connecting one of the three phase windings of the synchronous motor to direct current after switching off the three-phase current. The direct current flowing in the phase winding generates a magnetic field whose axis corresponds with the winding axis. This magnetic field exerts a force on the permanent magnet poles. The rotor of the synchronous motor turns until the poles with opposite polarity stand opposite one another. The transmission devices (orbiting induction coils) attached to the godet and the fixed transmission devices (fixed induction coils) of the measured value transmission device are positioned along the godet circumference in such a way that they stand opposite one another in this defined rest position of the godet.

DESCRIPTION OF DRAWINGS

The invention is explained in detail with the preferred embodiment illustrated in the drawings, wherein.

THE ILLUSTRATED EMBODIMENT

Figure 1:
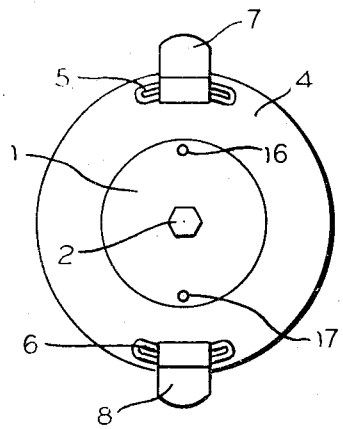
FIG. 1 is an end elevation of a godet and the measurement transmission devices.
Figure 2:
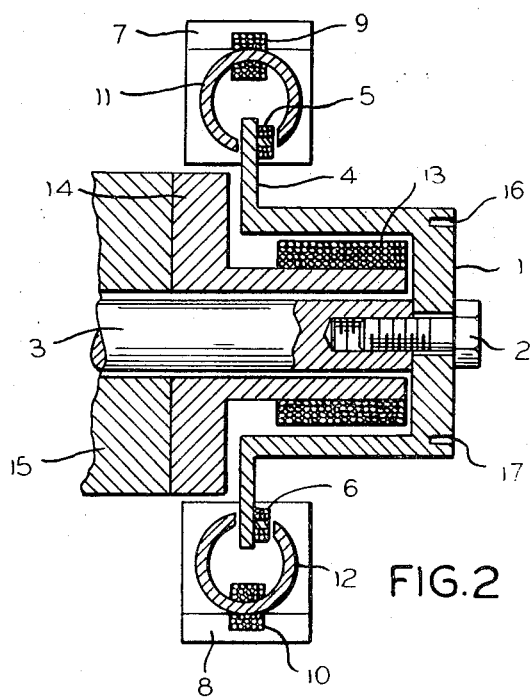
FIG. 2 is a diametric section taken on a vertical diametric section plane through FIG. 1 of the godet and its transmission devices.

The godet 1, which is a hollow cylinder with an end wall attached by means of the screw 2 to the rotatably driven shaft 3, has a ring flange 4, on which, standing diametrically opposite one another, there are mounted the two narrow, longitudinally arcuate induction coils 5 and 6. At a standstill they stand opposite to stationary, diametrically opposite induction coils 9 and 10 mounted on stationary mountings 7 and 8 attached to a frame. The induction coils 9 and 10 surround the split rings 11 and 12, through the gap of which the induction coils 5 and 6 orbit. The godet 1 is inductively heated by means of the stationary coil 13, which is positioned inside the hollow godet by a mounting tube 14 fixed to the frame 15. The temperature responsive resistance elements 16 and 17 are mounted in recesses in the end of the godet 1. The components of the Wien-Robinson measuring bridge are attached to the flange 4 as shown in German Pat. No. 1,223,029. The pairs of coils 5 and 6 serve as orbiting, contactless impulse transmission devices, with the stationary coils 9 and 10 serving as contactless devices positioned in the orbital path and adapted to respond to the impulses from said transmission devices as they orbit into juxtaposition therewith.

Figure 3:
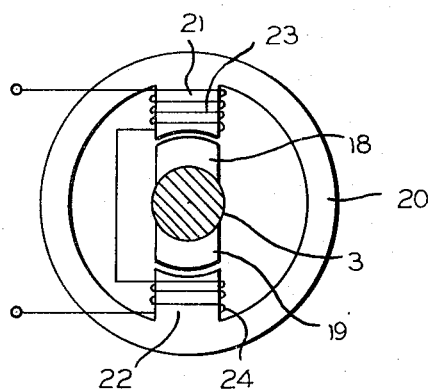
FIG. 3 is a front elevation of two projections on the drive shaft of the godet and stationary magnetic poles equipped with coils.
Figure 5:
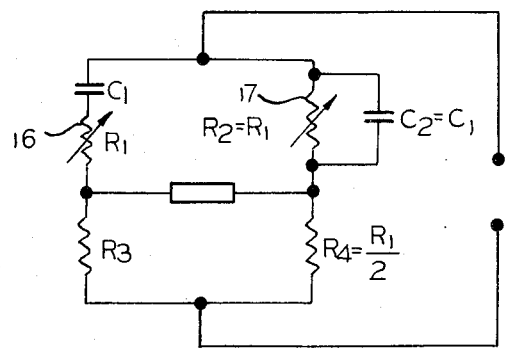
FIG. 5 shows the known Wien-Robinson bridge.

The drive shaft 3 of the godet has, as shown in FIG. 3, two radial projections 18 and 19. The shaft 3 is surrounded by a yoke 20 which carries two poles 21 and 22. The poles 21 and 22 are surrounded by the coils 23 and 24, which can be fed with direct or alternating voltage. After the switching off the godet drive motor, the two coils 23 and 24 are fed with direct or alternating current. From electromagnetic poles 21 and 22 there arise magnetic fields which attract the two projections 18 and 19 of the shaft 3. Thereby there is established a constant predetermined rest position of the godet, with the respective induction coils in juxtaposition to each other.

Figure 4:
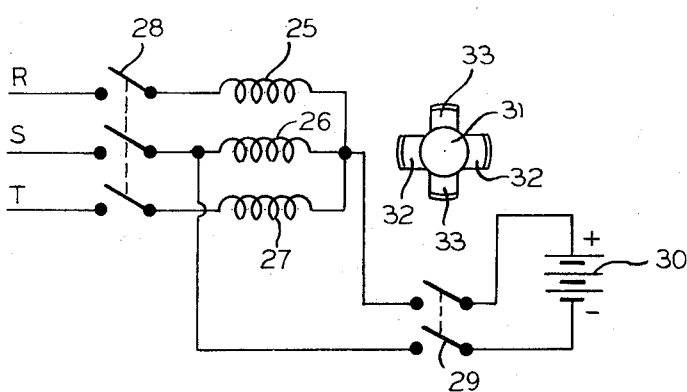
FIG. 4 is a circuit diagram for the feed of one phase winding of a four-pole synchronous motor with direct current.

A constant rest position of the godet can also be achieved with the circuit according to FIG. 4. The three windings 25, 26 and 27 of a four-pole synchronous motor used to drive the godet are connected with one another in a conventional star or triangle circuit. The winding ends are connected by means of the switch 28 with the three-phase main R,S,T. After the opening of the switch 28 the winding 26 is connected to a direct current source 30 by closing of switch 29. The winding 26 thereby generates a magnetic field, which attracts the rotor 31 with the permanent magnetic north poles 32 and the south poles 33 until the distance between the magnetic fields of stator and rotor becomes the smallest possible value.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the forms herein disclosed being preferred embodiments for the purpose of illustrating the invention.

The invention is hereby claimed as follows:

1. A godet embodying a rotatable cylinder, a Wien-Robinson measuring bridge mounted on and rotatable with said godet, a pair of contactless transmission devices on said godet for orbital travel during rotation of said godet, means operatively connecting said devices with said bridge, a pair of stationary contactless receiving devices positioned in the orbital path of said transmission devices and adapted to receive impulses therefrom as said transmission devices orbit into juxtaposition with said receiving devices and magnetically operable means operatively associated with said godet to bring said pairs of devices into juxtaposition when said godet is at rest.

2. A godet as claimed in claim 1 wherein said means embodies a pair of diametrically opposite projections rotatable with said godet, and a pair of opposite, stationary electromagnetic poles adapted, when energized, to bring said godet to rest position with said projection in juxtaposition to respective poles.

3. A godet as claimed in claim 2, a drive shaft attached to said godet, said projections extending radially therefrom, and said poles being positioned radially outwardly of said projections.

4. A godet as claimed in claim 1, a three phase, two- or four-pole, synchronous drive motor operatively connected to said godet, and said means embodying a circuit to supply to one of the three phase windings of said motor a direct current after the drive current to said motor is disconnected.

5. A godet as claimed in claim 1 wherein said devices are induction coils.

6. A godet as claimed in claim 1, and temperature-responsive electrical means mounted on said godet and connected to said bridge for measuring the temperature of said cylinder.

7. A rotatable member embodying a contactless transmission device adapted to orbit upon rotation of said member, a contactless receiving device positioned in the orbital path of said transmission device to receive impulses therefrom as it orbits into juxtaposition therewith, drive means for rotating said member, and magnetically operable means operatively associated with said drive means to bring said devices into juxtaposition when said member is at rest.

8. A member as claimed in claim 7 wherein said means embodies a pair of diametrically opposite projections rotatable with said member, and a pair of opposite, stationary electromagnetic poles adapted, when energized, to bring said member to rest position with said projections in juxtaposition to respective poles.

9. A member as claimed in claim 8, a drive shaft attached to said member, said projections extending radially therefrom, and said poles being positioned radially outwardly of said projections.

10. A member as claimed in claim 7, a three phase, two- or four-pole, synchronous drive motor operatively connected to said member, and said means embodying a circuit to supply to one of the three phase windings of said motor a direct current after the drive current to said motor is disconnected.

11. A member as claimed in claim 7 wherein said devices are induction coils.

* * * * *